US009531002B2

(12) United States Patent
Lu et al.

(10) Patent No.: US 9,531,002 B2
(45) Date of Patent: Dec. 27, 2016

(54) TRANSITION METAL CYANOMETALLATE CATHODE BATTERY WITH METAL PLATING ANODE

(71) Applicant: Sharp Laboratories of America, Inc., Camas, WA (US)

(72) Inventors: Yuhao Lu, Vancouver, WA (US); Long Wang, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/668,788

(22) Filed: Mar. 25, 2015

(65) Prior Publication Data

US 2015/0200390 A1 Jul. 16, 2015

Related U.S. Application Data

(63) Continuation-in-part of application No. 14/472,228, filed on Aug. 28, 2014, which is a continuation-in-part
(Continued)

(51) Int. Cl.
*H01M 4/136* (2010.01)
*C01C 3/12* (2006.01)
(Continued)

(52) U.S. Cl.
CPC ............... *H01M 4/136* (2013.01); *C01C 3/12* (2013.01); *H01M 4/0404* (2013.01);
(Continued)

(58) Field of Classification Search
CPC ...... H01M 4/136; H01M 4/133; H01M 4/587; H01M 2004/028; H01M 4/0404; H01M 4/0452; H01M 4/0471; H01M 4/1397; H01M 4/58; Y02E 60/122; C01C 3/12

See application file for complete search history.

(56) References Cited

U.S. PATENT DOCUMENTS

2005/0233219 A1* 10/2005 Gozdz ................. H01M 4/13
429/231.95
2010/0330420 A1* 12/2010 Ogawa ............... H01M 4/0421
429/209

(Continued)

OTHER PUBLICATIONS

Yabuuchi, N.; Kajiyama, M.; Iwatate, J.; Nishikawa, H.; Hitomi, S.; Okuyama, R.; Usui, R.; Yamada, Y.; Komaba, S. Nat. Mater. 2012, 11, 512.

(Continued)

*Primary Examiner* — Emily Le
*Assistant Examiner* — Monique Wills
(74) *Attorney, Agent, or Firm* — Law Office of Gerald Maliszewski; Gerald Maliszewski

(57) ABSTRACT

A method is provided for cycling power in a transition metal cyanometallate (TMCM) cathode battery. The method provides a battery with a TMCM cathode, an anode, and an electrolyte, where TMCM corresponds to the chemical formula of $A_X M1_N M2_M (CN)_Y \cdot d(H_2O)$, where "A" is an alkali or alkaline earth metal, and where M1 and M2 are transition metals. The method charges the battery using a first charging current, or greater. In response to the charging current, a plating of "A" metal is formed overlying a plating surface of the anode. In response to discharging the battery, the "A" metal plating is removed from the anode plating surface. In one aspect, in an initial charging of the battery, a permanent solid electrolyte interphase (SEI) layer is formed overlying the anode plating surface. In subsequent charging and discharging cycles, the permanent SEI layer is maintained overlying the anode plating surface.

21 Claims, 7 Drawing Sheets

Related U.S. Application Data of application No. 14/340,141, filed on Jul. 24, 2014, which is a continuation-in-part of application No. 14/320,352, filed on Jun. 30, 2014, which is a continuation-in-part of application No. 14/271,498, filed on May 7, 2014, now Pat. No. 9,419,278, which is a continuation-in-part of application No. 14/230,882, filed on Mar. 31, 2014, which is a continuation-in-part of application No. 14/198,755, filed on Mar. 6, 2014, which is a continuation-in-part of application No. 14/198,702, filed on Mar. 6, 2014, which is a continuation-in-part of application No. 14/198,663, filed on Mar. 6, 2014, which is a continuation-in-part of application No. 14/193,782, filed on Feb. 28, 2014, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.
| | | |
|---|---|---|
| *H01M 4/04* | (2006.01) | |
| *H01M 4/1397* | (2010.01) | |
| *H01M 4/58* | (2010.01) | |
| *H01M 4/66* | (2006.01) | |
| *H01M 10/054* | (2010.01) | |

(52) U.S. Cl.
CPC ....... *H01M 4/0452* (2013.01); *H01M 4/1397* (2013.01); *H01M 4/58* (2013.01); *H01M 4/661* (2013.01); *H01M 4/663* (2013.01); *H01M 4/667* (2013.01); *H01M 4/668* (2013.01); *H01M 10/054* (2013.01); *Y02E 60/122* (2013.01)

(56) References Cited

U.S. PATENT DOCUMENTS

| | | | | |
|---|---|---|---|---|
| 2012/0021264 A1* | 1/2012 | Morishima | ....... | H01M 10/0587 429/94 |
| 2012/0328936 A1* | 12/2012 | Wessells | ............ | H01M 10/054 429/188 |

OTHER PUBLICATIONS

Palomares, V.; Casas-Cabanas, M.; Castillo-Martinez, E.; Han, M.H.; Rojo, T. Energy Environ. Sci. 2013, 6, 2312.
V.D. Neff, "Some performance characteristics of a Prussian Blue battery", Journal of Electrochemical Society, 132 (1985) 1382-1384.
N. Imanishi et al., "Lithium intercalation behavior into iron cyanide complex as positive electrode of lithium secondary battery", Journal of Power Sources, 79 (1999) 25-219.
Y. Lu, L. Wang, J. Cheng, J.B. Goodenough, "Prussian blue: a new framework for sodium batteries", Chemistry Communication, 48(2012)6544-6546.
L. Wang, Y. Lu, J. Liu, M. Xu, J. Cheng, D. Zhang, J.B. Goodenough, "A superior low-cost cathode for a Na-ion battery", Angew. Chem. Int. Ed., 52(2013)1964-1967.
A. Eftekhari, "Potassium secondary cell based on Prussian blue cathode", J.Power Sources, 126 (2004) 221-228.
C.D. Wessells, R.A. Huggins, Y. Cui, "Copper hexacyanoferrate battery electrodes with long cycle life and high power, Nature Communication", 2( 2011) 550.
C.D. Wessells et al., Nickel hexacyanoferrate nanoparticle electrodes for aqueous sodium and potassium ion batteries, Nano Letters, 11(2011) 5421-5425.
C.D. Wessells et al., "The effect of insertion species on nanostructured open framework hexacyanoferrate battery electrode", J. Electrochem. Soc., 159(2012) A98-A103.
T.Matsuda, M. Takachi, Y. Moritomo, A sodium manganese ferrocyanide thin film for Na-ion batteries, Chemical Communications, DOI: 10.1039/C3CC38839E.
S.-H. Yu et al., "Iron hexacyanoferrate nanoparticles as cathode materials for lithium and sodium rechargeable batteries", ECS Electrochemistry Letters, 2(2013)A39-A41.

* cited by examiner

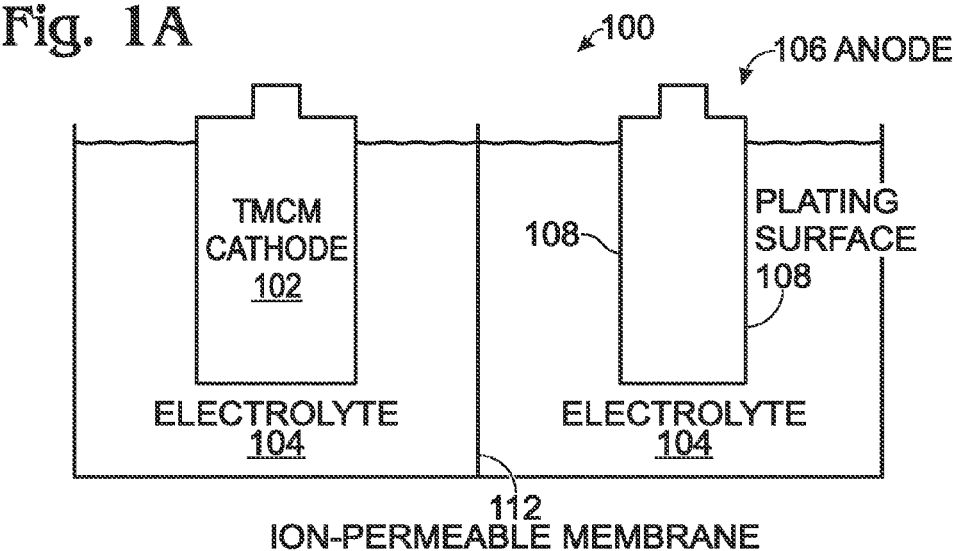
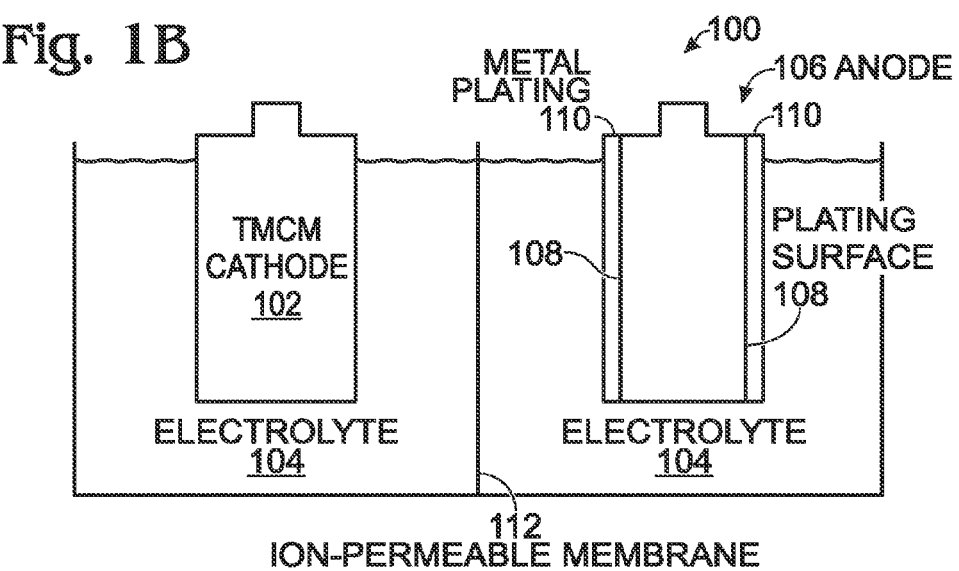
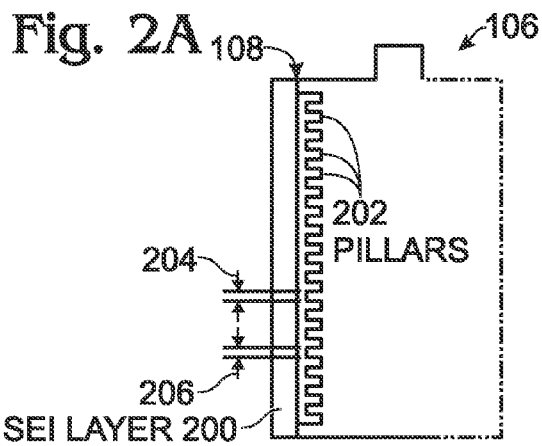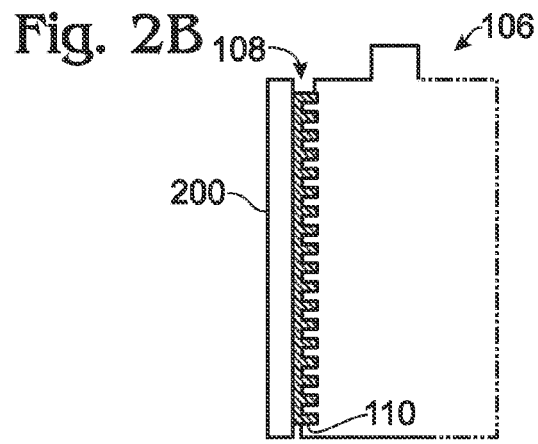

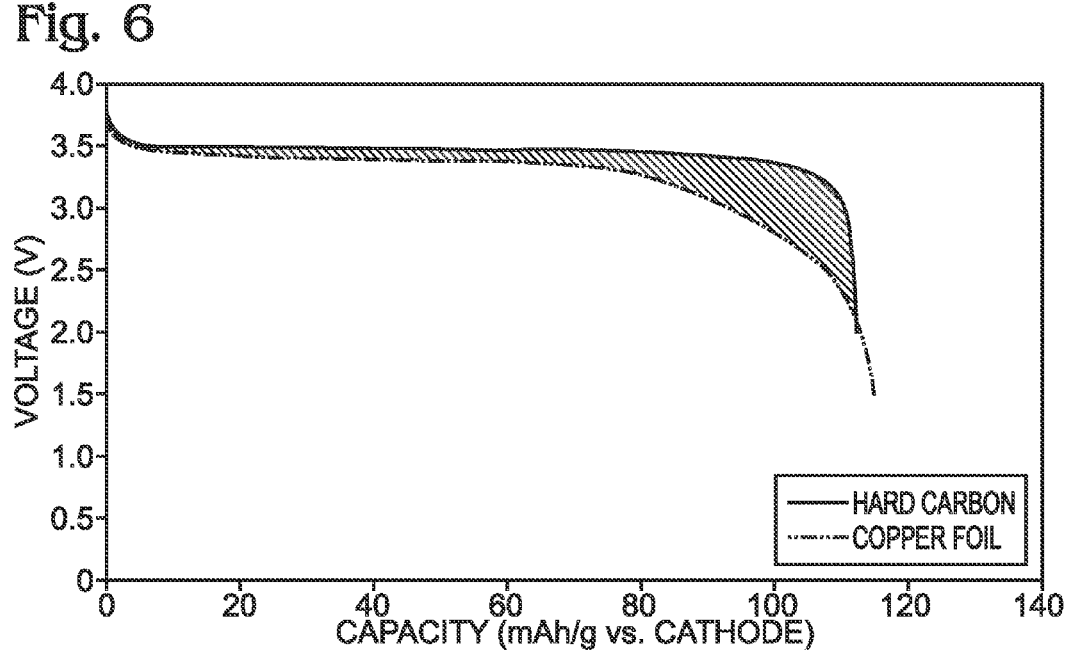
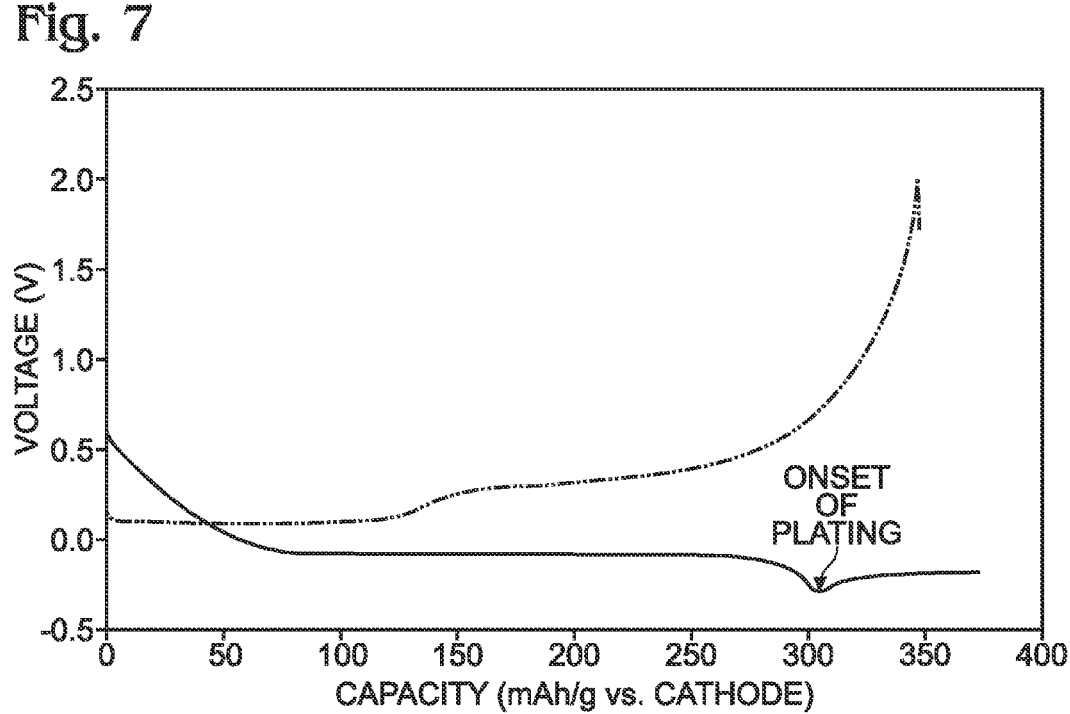

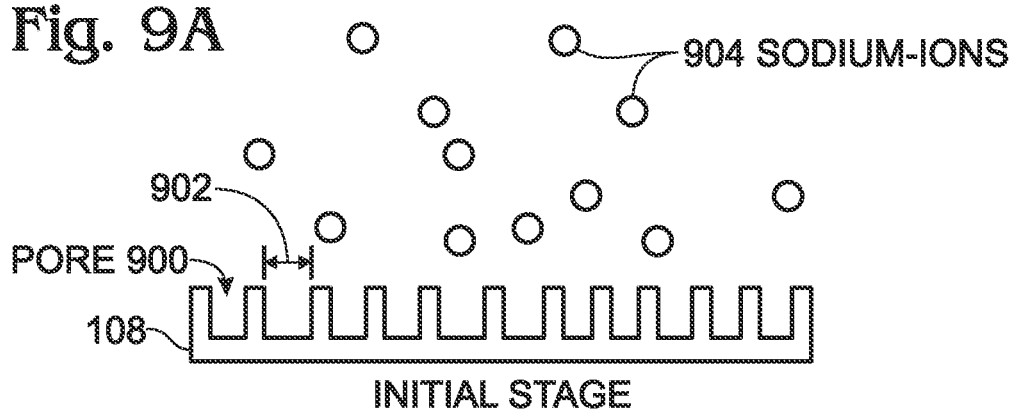
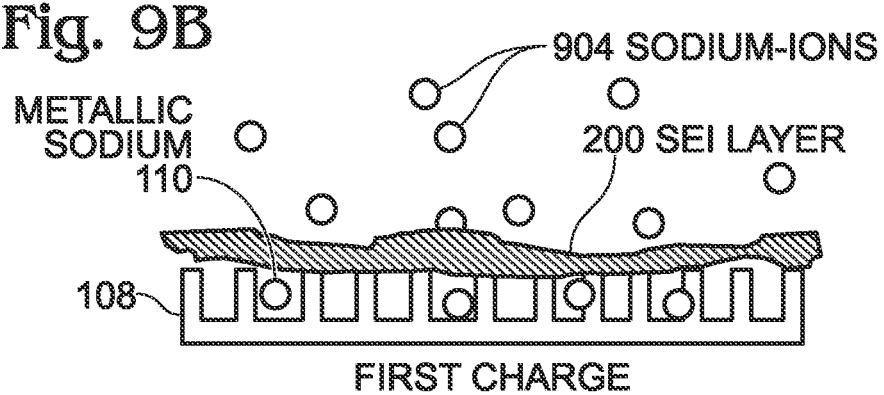
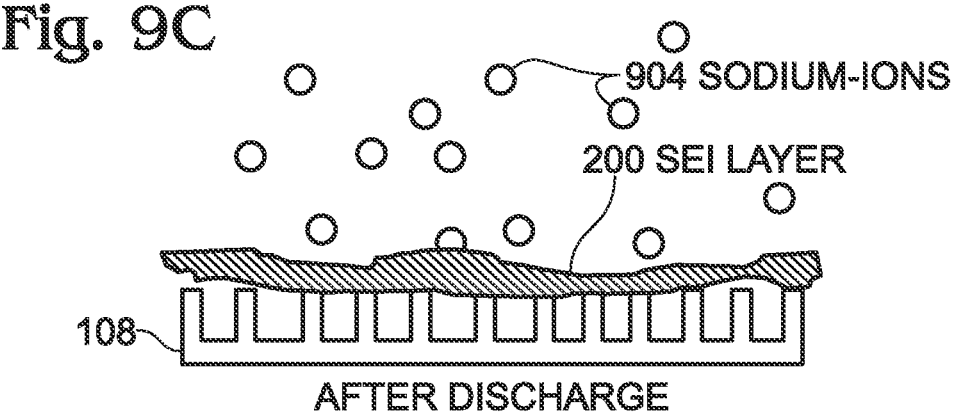

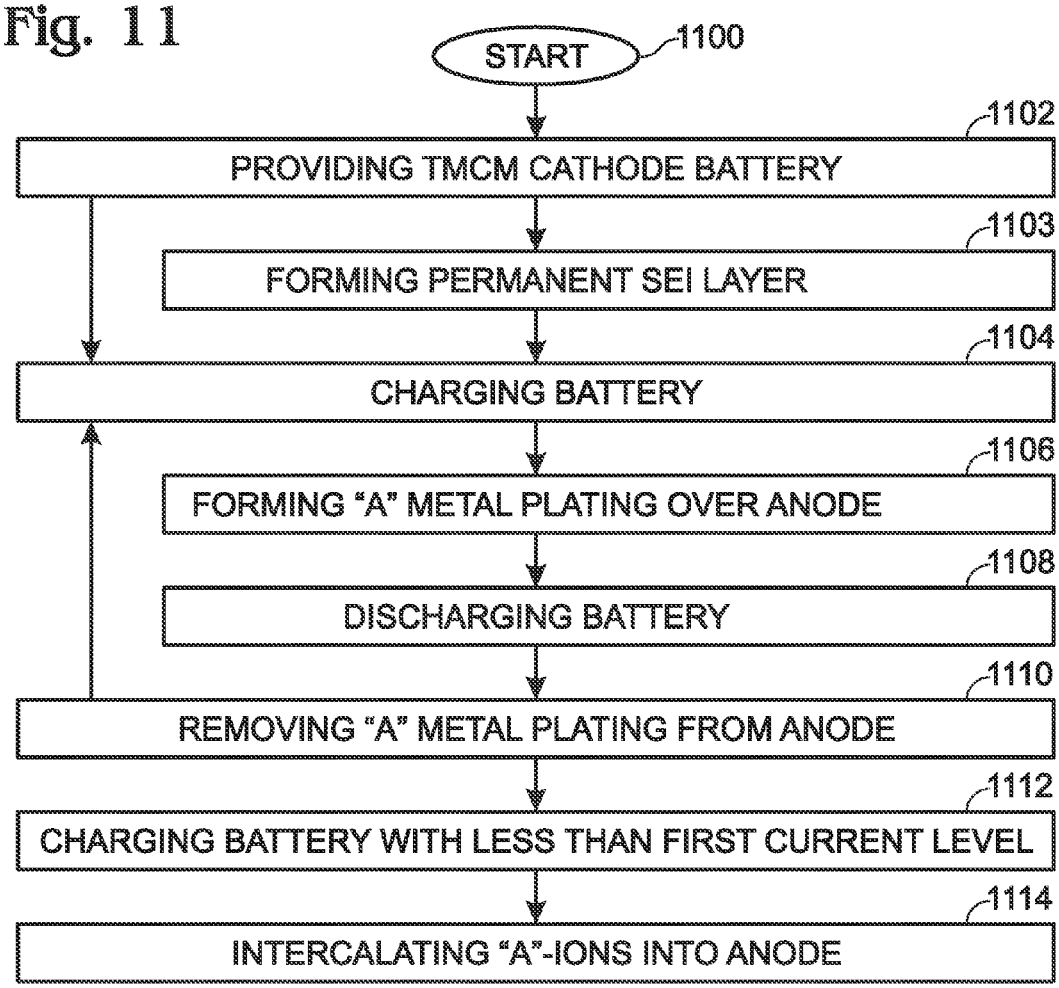

TRANSITION METAL CYANOMETALLATE CATHODE BATTERY WITH METAL PLATING ANODE

RELATED APPLICATIONS

This application is a Continuation-in-Part of an application entitled, METHOD FOR THE SYNTHESIS OF IRON HEXACYANOFERRATE, invented by Sean Vail et al, Ser. No. 14/472,228, filed Aug. 28, 2014, which is a Continuation-in-Part of an application entitled, TRANSITION METAL HEXACYANOMETALLATE ELECTRODE WITH WATER-SOLUBLE BINDER, invented by Long Wang et al, Ser. No. 14/340,141, filed Jul. 24, 2014, which is a Continuation-in-Part of an application entitled, ELECTROLYTE ADDITIVES FOR TRANSITION METAL CYANOMETALLATE ELECTRODE STABILIZATION, invented by Yuhao Lu et al, Ser. No. 14/320,352, filed Jun. 30, 2014;

Ser. No. 14/320,352 is a Continuation-in-Part of an application entitled, RECHARGEABLE METAL-ION BATTERY WITH NON-AQUEOUS HYBRID ION ELECTROLYTE, invented by Long Wang et al, Ser. No. 14/271,498, filed May 7, 2014, which is a Continuation-in-Part of an application entitled, REACTIVE SEPARATOR FOR A METAL-ION BATTERY, invented by Long Wang et al, Ser. No. 14/230,882, filed Mar. 31, 2014, which is a Continuation-in-Part of an application entitled, NASICON-POLYMER ELECTROLYTE STRUCTURE, invented by Long Wang et al, Ser. No. 14/198,755, filed Mar. 6, 2014, which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014, which is a Continuation-in-Part of an application entitled, BATTERY ANODE WITH PRELOADED METALS, invented by Long Wang et al, Ser. No. 14/198,663, filed Mar. 6, 2014, which is a Continuation-in-Part of an application entitled, METAL BATTERY ELECTRODE WITH PYROLYZED COATING, invented by Yuhao Lu et al, Ser. No. 14/193,782, filed Feb. 28, 2014, which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014, which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013, which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013, which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013, now U.S. Pat. No. 8,968,925, issued on Mar. 3, 2015;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013, which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013, which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013, which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012, which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012, which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical batteries and, more particularly, to a method for the plating of an alkali or alkane earth metal over the anode of a transition metal cyanometallate (TMCM) cathode battery.

2. Description of the Related Art

Energy storage for renewable but variable solar and wind power has instigated an urgent demand for rechargeable batteries. Although rechargeable lithium-ion batteries are currently dominating this application, the goal of meeting a cost target of less than $100 per kilowatt hour (/kWh) is proving to be formidable. Sodium-ion batteries with insertion-compound cathodes analogous to the cathodes of lithium-ion batteries offer a higher energy density than aqueous batteries and a lower cost than lithium-ion batteries [1]. The layered oxides and framework structures containing $(XO_4)_n-$ polyanions [2] that have been studied as cathodes for Na-ion batteries show a limited capacity that is further reduced in a cell that must be fabricated in a discharged state with an anode devoid of Na atoms. In addition, their high-temperature synthesis is a process of high energy consumption. On the other hand, Prussian-blue analogues (PBAs) with the general chemical formula $A_xM_a[M_b(CN)_n]_y \cdot zH_2O$ are framework structures synthesized at low temperature that support a reversible extraction of two Na/formula units (fu) at high rates, with a good cycle life.

Prussian-blue analogues, or transition metal cyanometallate (TMCM), have been investigated as the cathode materials for rechargeable lithium-ion batteries [3,4], sodium-ion batteries [5, 6], and potassium-ion batteries [7]. With an aqueous electrolyte containing alkali-ions or ammonium-ions, copper and nickel hexacyanoferrates ((Cu,Ni)-HCFs) exhibited a very good cycling life, where 83% capacity was retained after 40,000 cycles at a charge/discharge current of 17C [9-10], where 1C is the current, per gram, required to fully charge or discharge a battery in one hour. However, the materials demonstrated low capacities and energy densities because (1) only one sodium-ion can be inserted/extracted into/from per Cu-HCF or Ni-HCF formula and (2) these transition metal (TM)-HCFs electrodes must be operated below 1.23 V due to water electrochemical window. To correct for these shortcomings, manganese hexacyanoferrate (Mn-HCF) and iron hexacyanoferrate (Fe-HCF) were used as cathode materials in a non-aqueous electrolyte [11, 12]. Assembled with a sodium-metal anode, Mn-HCF and Fe-HCF electrodes were cycled between 2.0V and 4.2 V and delivered capacities of about 110 milliamp hours per gram (mAh/g).

To improve the capacity even further, a sodium-ion battery with a non-sodium anode would be useful. Currently, non-sodium metal anodes can be put into three categories: carbonaceous materials, metals/metal chalcogenides (oxides and sulfides), and organic chemicals. However, there are unique challenges that must be overcome for each type of material, for example, slow sodiation kinetics for hard carbon, pulverization for alloys, and dissolution for organics.

It would be advantageous if a new anode strategy could be adopted in order to develop practical sodium-ion batteries.

[1] Yabuuchi, N.; Kajiyama, M.; Iwatate, J.; Nishikawa, H.; Hitomi, S.; Okuyama, R.; Usui, R.; Yamada, Y.; Komaba, S. Nat. Mater. 2012, 11, 512.
[2] Palomares, V.; Casas-Cabanas, M.; Castillo-Martinez, E.; Han, M. H.; Rojo, T. Energy Environ. Sci. 2013, 6, 2312.
[3] V. D. Neff, Some performance characteristics of a Prussian Blue battery, Journal of Electrochemical Society, 132 (1985) 1382-1384.
[4] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.
[5] Y. Lu, L. Wang, J. Cheng, J. B. Goodenough, Prussian blue: a new framework for sodium batteries, Chemistry Communication, 48(2012)6544-6546.
[6] L. Wang, Y. Lu, J. Liu, M. Xu, J. Cheng, D. Zhang, J. B. Goodenough, A superior low-cost cathode for a Na-ion battery, Angew. Chem. Int. Ed., 52(2013)1964-1967.
[7] A. Eftekhari, Potassium secondary cell based on Prussian blue cathode, J. Power Sources, 126 (2004) 221-228.
[8] C. D. Wessells, R. A. Huggins, Y. Cui, Copper hexacyanoferrate battery electrodes with long cycle life and high power, Nature Communication, 2(2011) 550.
[9] C. D. Wessells, S. V. Peddada, R. A. Huggins, Y. Cui, Nickel hexacyanoferrate nanoparticle electrodes for aqueous sodium and potassium ion batteries. Nano Letters, 11(2011) 5421-5425.
[10] C. D. Wessells, S. V. Peddada, M. T. McDowell, R. A. Huggins, Y. Cui, The effect of insertion species on nano-structured open framework hexacyanoferrate battery electrode, J. Electrochem. Soc., 159(2012) A98-A103.
[11] T. Matsuda, M. Takachi, Y. Moritomo, A sodium manganese ferrocyanide thin film for Na-ion batteries, Chemical Communications, DOI: 10.1039/C3CC38839E.
[12] S.-H. Yu, M. Shokouhimehr, T. Hyeon, Y.-E. Sung, Iron hexacyanoferrate nanoparticles as cathode materials for lithium and sodium rechargeable batteries, ECS Electrochemistry Letters, 2(2013)A39-A41.

SUMMARY OF THE INVENTION

Disclosed herein is a novel structure for rechargeable Prussian-blue analogue (PBA) or transition metal cyanometallate (TMCM) sodium-ion batteries in which it is not necessary to use active materials in the anode, such as graphite and hard carbon, and as such, there may only be a current collector at the anode side. Under some circumstances, structural substrates can be attached on the current collector. During charge, "A"-ions (e.g., sodium-ions) move out of PBA cathodes, with the chemical formula corresponding to $(A_xM1_nM2_m(CN)_z \cdot dH_2O)$, and directly electroplate onto anode current collector/structural substrates via an internal electric field, rather than chemically interact with anode materials, as in conventional batteries. The "A" metal dissolves in the electrolyte during discharge. The strategy can be extended to all PBA metal-ion batteries. To improve the capacity further, high sodium concentrated Fe-hexacyanoferrate (HCF) and Mn-HCF cathodes may be used.

A structural substrate can be attached onto the anode current collector. The structure of the substrate helps to support a solid electrolyte interphase (SEI) layer formation and enhance the plating process. The electrolyte can be a non-aqueous liquid, polymer, gel, or solid. The current collector and the structural substrate can be selected from metals such as aluminum, copper, nickel, iron, etc. Carbonaceous materials can also be used as the current collector. To repeat, no chemical reactions need take place between "A"-ions and the anode materials. However, the strategy can be used with anodes containing active materials (e.g., hard carbon) as long as metal plating occurs on the anode materials.

Accordingly, a method is provided for cycling power in a TMCM cathode battery. The method provides a battery with a TMCM cathode, an anode, and an electrolyte, where TMCM corresponds to the chemical formula of $A_XM1_NM2_M(CN)_Y \cdot d(H_2O)$:
where "A" is an alkali or alkaline earth metals;
where M1 and M2 are transition metals;
where X is in the range of 0 to 4;
where N is in the range of 0 to 2;
where M is in the range of 0 to 2;
where Y is in the range of 1 to 6; and,
where d is in the range of 0 to 14.

The method charges the battery using a first charging current, or greater. In response to the charging current, a plating of "A" metal is formed overlying a plating surface of the anode. In response to discharging the battery, the "A" metal plating is removed from the anode plating surface. Subsequent to discharging the battery, if the battery is charged with a charging current less than the first current level, then "A"-ions may intercalate into the anode plating surface.

In one aspect, in an initial charging of the battery, a permanent solid electrolyte interphase (SEI) layer is formed overlying the anode plating surface. In subsequent charging and discharging cycles, the permanent SEI layer is maintained overlying the anode plating surface. During charging, the permanent SEI layer passes "A"-ions to the anode plating surface. In another aspect, an ion-permeable barrier, permeable to "A"-ions, coats the anode plating surface, and when the battery is charged, an SEI layer fails to form over the anode. The ion-permeable barrier may be a solid electrolyte, beta-alumina, phosphate, thiophosphate, or combinations thereof.

Additional details of the above-described method and a TMCM cathode battery with a metal plating anode are provided below.

BRIEF DESCRIPTION OF THE DRAWINGS

FIGS. 1A and 1B are partial cross-sectional views of a transition metal cyanometallate (TMCM) cathode battery with a metal plating anode.

FIGS. 2A and 2B are partial cross-sectional views of a first variation of the anode of FIG. 1, respectively, in the discharged and charged states.

FIG. 6 is a graph comparing typical discharge curves from a (1) cell with a Mn-PBA cathode and hard carbon anode, and a (2) cell with Mn-PBA cathode and copper anode current collector.

FIG. 7 is a graph depicting the charge and discharge of hard carbon electrodes in half cells.

FIGS. 9A through 9C depict stages in forming a SEI layer.

FIG. 11 is a flowchart illustrating a method for cycling power in a TMCM cathode battery.

DETAILED DESCRIPTION

Figure 3:
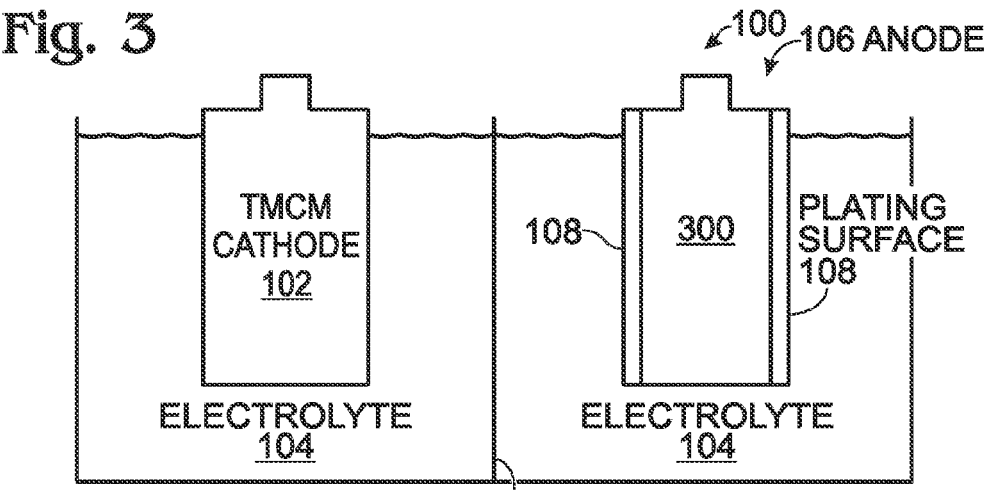
FIG. 3 is a partial cross-sectional view of a second variation of the battery, shown in the discharged state.

FIGS. 1A and 1B are partial cross-sectional views of a transition metal cyanometallate (TMCM) cathode battery with a metal plating anode. The battery 100 comprises a TMCM cathode 102 comprising $A_X M1_N M2_M (CN)_Y \cdot d(H_2O)$:

where "A" is an alkali or alkaline earth metal;
where M1 and M2 are transition metals;
where x is in the range of 0 to 4;
where N is in the range of 0 to 2;
where M is in the range of 0 to 2;
where Y is in the range of 1 to 6; and,
where d is in the range of 0 to 14.

The battery 100 further comprises an electrolyte 104 and an anode 106 with a plating surface 108. When the battery 100 is in the discharged state (FIG. 1A), no "A" metal overlies the plating surface 108. The anode plating surface 108 may be a metal, carbonaceous material, semiconductor, or conductive polymer. When the battery 100 is in the charged state (FIG. 1B), the anode plating surface 108 includes an overlying layer of "A" metal plating 110. Further, "A"-ions fail to intercalate into, or alloy with the plating surface 108 of the anode 106 when the battery 100 is in the charged state.

As used herein, the term "intercalate" is defined as "A"-ions chemically reacting or alloying with another material (i.e., an anode material). As used herein, a battery discharged state is defined as the condition where "A"-ions are fully intercalated into the cathode. As used herein, a battery charged state is defined as the condition where the "A"-ions are fully extracted from the cathode.

In some aspects as shown, an ion-permeable membrane 112 separates the anode 106 from the cathode, depending on the type of electrolyte used. For example, the ion-permeable membrane 112 would be used with a liquid electrolyte 104. As would be well understood in the art, a solid electrolyte would not require the use of an ion-permeable membrane. Some examples of electrolytes that might be used include non-aqueous liquids, polymers, gels, and solid electrolytes.

FIGS. 2A and 2B are partial cross-sectional views of a first variation of the anode of FIG. 1, respectively, in the discharged and charged states. In this aspect, subsequent to an initial charge, which forms a permanent solid electrolyte interphase (SEI) layer 200, the permanent SEI layer continues to exist in both the battery charged and battery discharged states, overlying the anode plating surface 108.

In conventional lithium or sodium-ion batteries, the anode materials are very active, and it is inevitable that organic electrolytes react with those anodes to decompose. The decomposing compounds accumulate on the surfaces of anodes to form passivating layers that prevent the direct contact between electrolytes and anodes, stopping the electrolyte decomposition. Since this layer behaves similarly to a solid electrolyte interphase, so it is called a SEI layer. Although SEI layers separate the electrolytes and anode materials, ions (e.g., Li-ions in a lithium-ion battery and Na-ions in a sodium-ion battery) can freely move in the layers to realize the charge transfer between electrolytes and anodes. As a result, a SEI layer is generally considered as an electronic insulator but an ionic conductor. The SEI layers have been studied more than 30 years, but their exact compositions are still unknown. Between different electrolytes, or in same electrolyte but using different anode materials, the formed SEI layers demonstrate different compositions.

The permanent SEI layer 200 is formed over an anode plating surface 108 having an architecture of pillars or pores. Shown are pillars 202 with a pillar diameter 204 in the range of 0.1 nm to 100 microns, with a distance 206 between pillars in a range of 0.1 nm to 100 microns. When a pore architecture is used (see FIG. 9A), the pores 900 having a pore size 902 in the range of 0.1 nanometers (nm) to 100 microns.

FIG. 3 is a partial cross-sectional view of a second variation of the battery, shown in the discharged state. In this aspect, the anode 106 comprises a current collector 300 made from a first electrically conductive material. The anode plating surface 108 is a substrate overlying the current collector 300, made from a second electrically conductive material. Some examples of the first and second electrically conductive materials include metals, carbonaceous material, semiconductor, and conductive polymers.

Figure 4A:
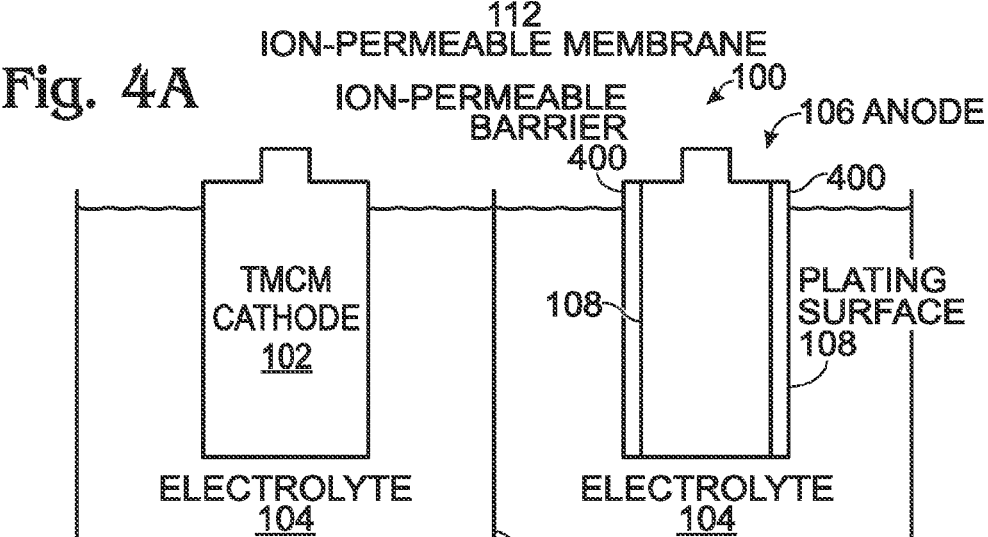
FIGS. 4A and 4B are partially cross-sectional views depicting a third variation of the battery of FIG. 1 in the discharged and charged states, respectively.
Figure 4B:
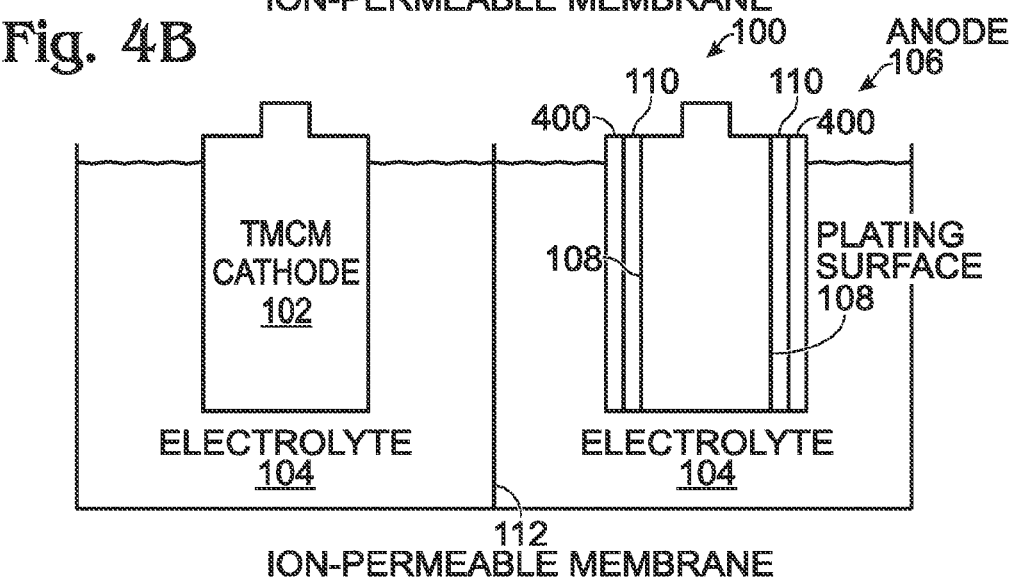

FIGS. 4A and 4B are partially cross-sectional views depicting a third variation of the battery of FIG. 1 in the discharged and charged states, respectively. In this aspect, the anode 106 comprises an ion-permeable barrier 400, permeable to "A"-ions, coating the anode plating surface 108. For example, the ion-permeable barrier 400 may be a solid electrolyte. That is, the ion-permeable barrier 400 is also the electrolyte 104. Otherwise, the ion-permeable barrier 400 may be a material such as beta-alumina, phosphate, thiophosphate, or combinations thereof. As shown, the electrolyte 104 is a liquid electrolyte. Subsequent to an initial charge, the battery 100 fails to form an SEI layer overlying the ion-permeable barrier 400.

The invention focuses on a novel structure for rechargeable metal-ion batteries that consists of a TMCM (i.e. Prussian-blue analogue (PBA)) cathode, and on the anode side, an electrode that may be as simple as a current collector. It is not necessary to include any active anode materials, such as graphite and hard carbon, which chemically react with "A"-ions to realize the energy storage and conversion. Under some circumstances, a structural substrate (e.g., FIG. 3) can be applied onto the current collector. The "A"-ions move out of the PBA cathode and plate onto the anode current collector/structural substrate during charge. In the subsequent discharge, the metallic "A" dissolves from the current collector. The strategy can be used in all rechargeable sodium or potassium-ion batteries using PBA cathodes. Moreover, the concept can be applied to anode made from active materials that can alloy or chemically react with "A"-ions to improve the battery performance.

Example 1

Figure 5A:
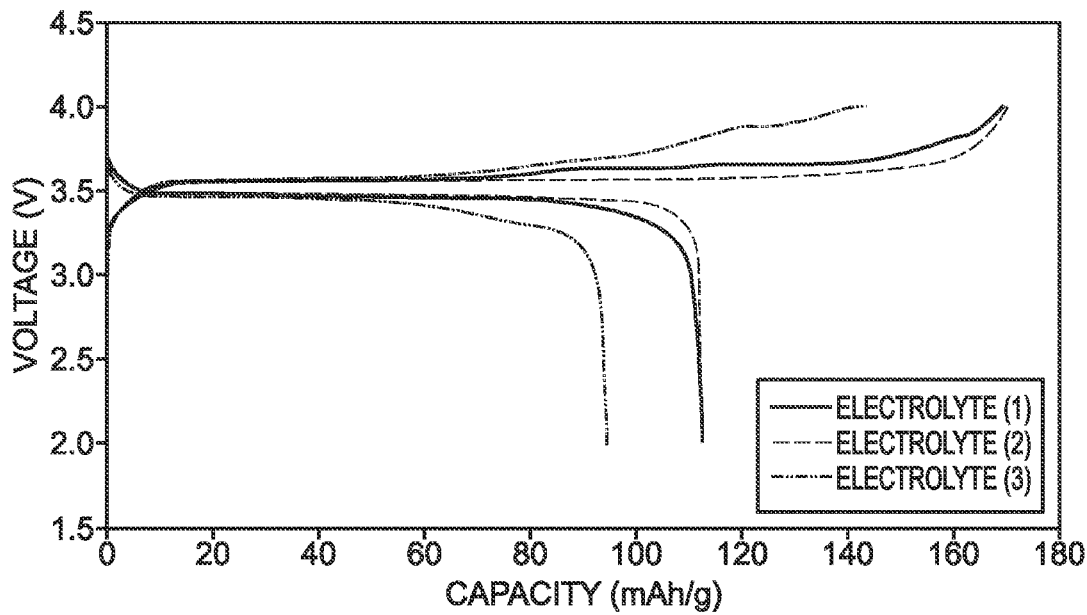
FIGS. 5A and 5B are graphs depicting the electrochemical performance of a battery with a Mn-PBA cathode and copper foil anode, using three different electrolytes.
Figure 5B:
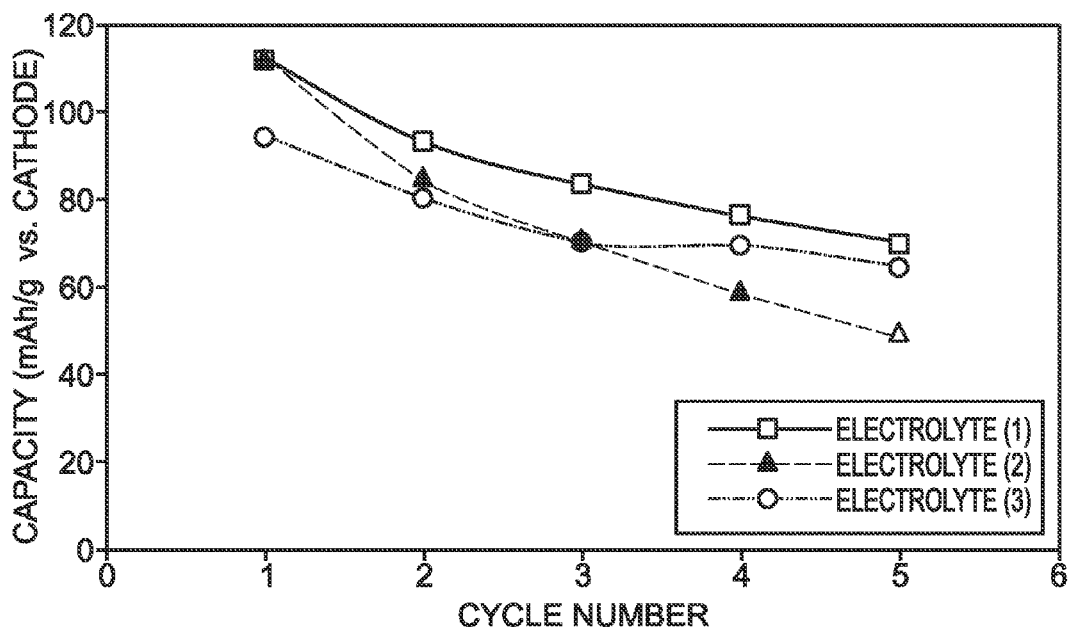

Sodium-Ion Battery with $Na_xMnFe(CN)_6$ Cathode and Anode Current Collector of Copper Foil FIGS. 5A and 5B are graphs depicting the electrochemical performance of a battery with a Mn-PBA cathode and copper foil anode, using three different electrolytes. The sodium-ion batteries included a $Na_xMnFe(CN)_6$ (Mn-PBA) cathode and no active material in the anode. The anode was only a piece of copper foil used as a current collector. A layer of polyethylene film was placed between the PBA cathode and the copper foil current collector. Electrolytes of (1) 1M $NaPF_6$ in ethylene carbonate (EC)/diethyl carbonate (DEC), (2) 1M $NaPF_6$ in EC/dimethyl carbonate (DMC), and (3) 1M $NaPF_6$ in EC/propylene carbonate (PC) were used in batteries to evaluate their performance. Batteries with electrolytes (1) and (2) exhibited similar behavior, but a higher polarization was observed in the charge curve of the cell with electrolyte (1). In addition, it was noticed that the electrolyte with PC gave rise to unstable charge behavior and a small discharge capacity in the voltage range of 2-4 volts.

During charge, sodium plated onto the copper current collector from the Mn-PW cathode. In the subsequent discharge, the metallic sodium provided a low anode potential, which led to a high work voltage for the sodium-ion battery.

FIG. 6 is a graph comparing typical discharge curves from a (1) cell with a Mn-PBA cathode and hard carbon anode, and a (2) cell with Mn-PBA cathode and copper anode current collector. It can be seen that cell (2) has a higher energy density than cell (1). Here, an electrolyte of 1M $NaPF_6$ in EC/DEC was used.

Example 2

Combination of Hard Carbon Anode and Plated Sodium

Not only can copper foil be plated with sodium during charge, but also other materials can be adopted as the substrate in sodium-ion batteries. The substrate can be applied onto the current collector (see FIG. 3). The sodium can be plated onto the substrate.

FIG. 7 is a graph depicting the charge and discharge of hard carbon electrodes in half cells. The current is 1C (1C=250 mA/g). It is been widely known that hard carbon cannot be sodiated fast. However, once a high sodiating current, for example 1C, is applied to the hard carbon electrode, sodium electrode plating occurs. Therefore, in a full cell consisting of a Mn-PBA cathode and a hard carbon anode, sodium-ions plate onto the hard carbon layer as long as the charge current is above 1C. Under these circumstances, the hard carbon layer can be considered as a kind of substrate with a porous structure. In addition, additives may be used in the electrolyte to ensure that sodium plating/striping works at a high reversible efficiency.

Figure 8:
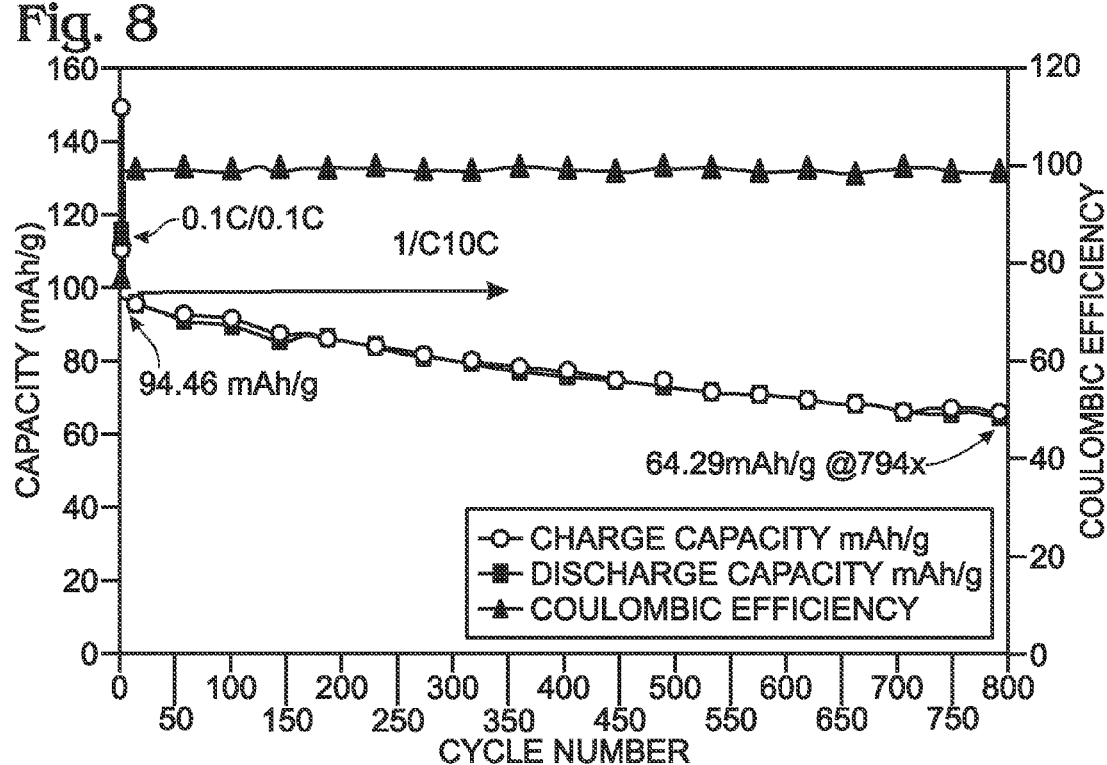
FIG. 8 is a graph depicting the performance of cells with a Mn-PBA cathode and a hard carbon anode cycled at 1C and discharged at 10C.

FIG. 8 is a graph depicting the performance of cells with a Mn-PBA cathode and a hard carbon anode cycled at 1C and discharged at 10C. Sodium-plating occurs on the hard carbon substrate.

Example 3

Architectural Current Collector/Substrate

FIGS. 9A through 9C depict stages in forming a SEI layer. A sodium-ion battery may consist of a Mn-PBA cathode and an anode current collector separated by a sodium-ion permeable membrane. In order to transfer sodium-ions back and forth between the Mn-PBA and the anode current collector, liquid electrolyte is soaked in the electrode and membrane. However, an inert film, referred to as an SEI layer, may form on the surface of metallic sodium in order to prevent the continuous reaction between the metallic sodium and the electrolyte. If such a reaction occurs with every charge, the sodium-ions are exhausted continuously, and the cell degrades rapidly. To solve the problem, an architectural current collector/substrate can be used to support the SEI layer that is formed during first charge. In the subsequent cycles, the SEI layer 200 prevents metallic sodium 110 from contacting the electrolyte (not shown), which stops the consumption of irreversible sodium in the cell.

A porous copper plating surface is shown (anode current collector). Of course, the porous copper can be considered as a substrate and attached onto another kind of current collector. The pores 900 having a pore size 902 in the range of 0.1 nanometers (nm) to 100 microns. During the first charge in a sodium-ion battery, sodium-ions 904 form a metallic plate 110 on the surface copper and a SEI layer 200 forms spontaneously. The porous copper structure 108 sustains the SEI layer 200 even after discharge. In subsequent charge cycles, sodium-ions 904 penetrate through the SEI layer 200 and plate onto the current collector/substrate 108, but the permanent SEI layer 200 need not be reformed or augmented.

Example 4

Modified Current Collector with Ion-Permeable Barrier

Figure 10A:
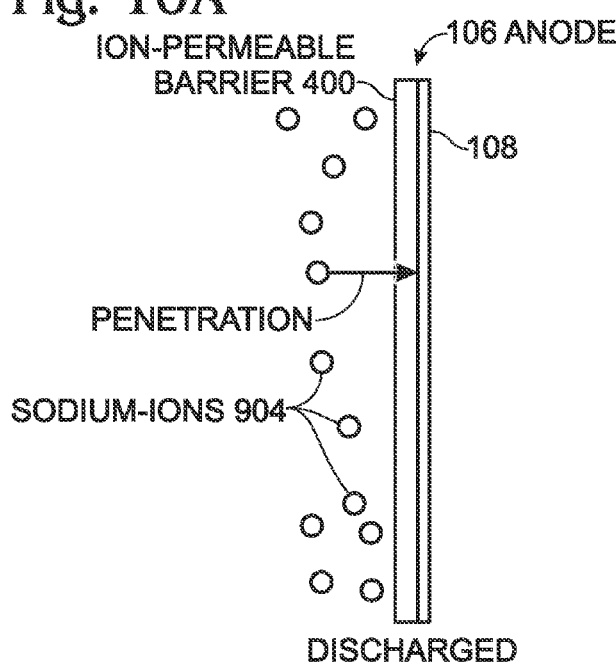
FIGS. 10A and 10B respectively depict a discharged and charged anode with an overlying ion-permeable barrier.
Figure 10B:
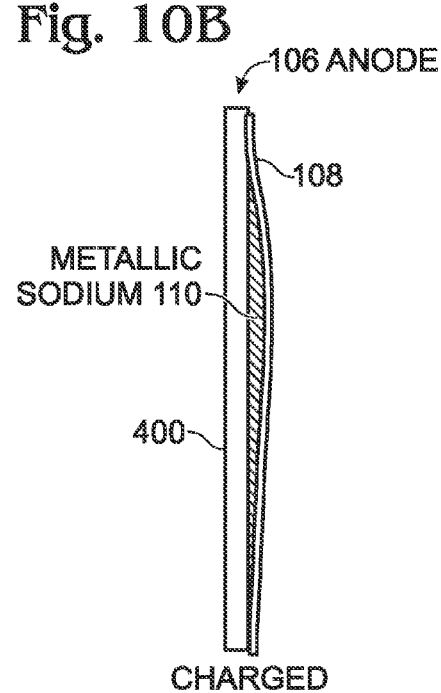

FIGS. 10A and 10B respectively depict a discharged and charged anode with an overlying ion-permeable barrier. A sodium-ion battery may consist of a Mn-PBA cathode (not shown) and a current collector/substrate 108. To avoid the SEI layer formation, which may degrade the cell performance, an ion-permeable barrier 400 may be formed on to the surface of current collector 108 in order to prevent liquid electrolyte from contacting the plated sodium. The ion-permeable barrier 400 can be a polymer or inorganic solid or their composites. A copper foil anode can be modified by beta-alumina layer that prevents liquid electrolyte from contacting the surface of the current collector. During charge, sodium-ions transfer through the solid electrolyte and plate onto the copper foil. In the subsequent discharge, sodium-ions move back to Mn-PBA cathode through the beta-alumina layer and electrolyte.

FIG. 11 is a flowchart illustrating a method for cycling power in a TMCM cathode battery. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1100.

Step 1102 provides a battery with a TMCM cathode, an anode, and an electrolyte, where TMCM corresponds to the chemical formula of $A_X M1_N M2_M (CN)_Y \cdot d(H_2 O)$:
where "A" is an alkali or alkaline earth metal;
where M1 and M2 are transition metals;
where x is in the range of 0 to 4;
where N is in the range of 0 to 2;
where M is in the range of 0 to 2;
where Y is in the range of 1 to 6; and,
where d is in the range of 0 to 14.

The anode plating surface may be one of the following materials: metals, carbonaceous materials, semiconductors, or conductive polymers. Step 1104 charges the battery using a charging current. In response to the charging current, Step 1106 forms a plating of "A" metal overlying a plating surface of the anode. Step 1108 discharges the battery. In response to discharging the battery, Step 1110 completely removes the "A" metal plating from the anode plating surface. Depending on the discharge current and duration, the "A" metal need not be completely removed.

In one aspect, Step 1104 charges the battery with a charging current greater than a first current level. That is, the plating that occurs in Step 1106 is a result of the charging current being sufficiently high. In another aspect, subsequent to discharging the battery in Step 1108, Step 1112 charges the battery with a charging current less than the first current level. As a result, in Step 1114 "A"-ions may intercalate into the anode plating surface.

In one variation, Step 1103 forms a permanent SEI layer overlying the anode plating surface in an initial charging of the battery. In subsequent charging (e.g., Step 1104) and discharging (e.g., Step 1108) cycles, the permanent SEI layer is maintained overlying the anode plating surface. That is, charging the battery in Step 1104 includes the permanent SEI layer passing "A"-ions to the anode plating surface.

In another variation, Step 1102 provides an anode with an ion-permeable barrier, permeable to "A"-ions, coating the anode plating surface. Then, charging the battery in Step 1104 includes failing to form an SEI layer overlying the anode plating surface when the battery is being charged. The ion-permeable barrier may be, for example, beta-alumina, phosphate, thiophosphate, or combinations thereof.

A TMCM cathode battery with a metal plating anode has been provided. Examples of particular materials and process details have been presented to illustrate the invention. However, the invention is not limited to merely these examples. Although sodium-ions were presented in many of the examples, it should be understood that the invention is applicable to other alkali and alkaline earth metal. Other variations and embodiments of the invention will occur to those skilled in the art.

We claim:

1. A transition metal cyanometallate (TMCM) cathode battery with a metal plating anode, the battery comprising:
a TMCM cathode comprising $A_X M1_N M2_M N(CN)_Y \cdot d(H_2 O)$,
where "A" is selected from a group of alkali or alkaline earth metals;
where M1 and M2 are transition metals;
where X is in a range of 0 to 4;
where N is in a range of 0 to 2;
where M is in a range of 0 to 2;
where Y is in a range of 1 to 6;
where d is in a range of 0 to 14;
a non-aqueous electrolyte; and,
an anode comprising a plating surface, configured such that no "A" metal overlying the plating surface when the battery is in the discharged state.

2. The battery of claim 1 wherein the anode plating surface includes an overlying layer of "A" metal plating, when the battery is in the charged state.

3. The battery of claim 2 wherein the "A" ions fail to intercalate into the plating surface of the anode when the battery is in the charged state.

4. The battery of claim 2 further comprising:
subsequent to an initial charge, a permanent solid electrolyte interphase (SEI) layer, existing in both the battery charged and battery discharged states, overlying the anode plating surface.

5. The battery of claim 4 wherein the permanent SEI layer is formed over an anode plating surface having an architecture selected from the group consisting of pillars and pores.

6. The battery of claim 5 wherein the pore size is in a range of 0.1 nanometers (nm) to 100 microns.

7. The battery of claim 5 where the pillar diameter is in a range of 0.1 nm to 100 microns, with a distance between pillars in a range of 0.1 nm to 100 microns.

8. The battery of claim 1 wherein the anode plating surface is a material selected from the group consisting of metals, carbonaceous materials, semiconductors, and conductive polymers.

9. The battery of claim 8 wherein the anode further comprises a current collector made from a first electrically conductive material; and,
wherein the anode plating surface is a substrate overlying the current collector, made from a second electrically conductive material.

10. The battery of claim 1 wherein the anode further comprises an ion-permeable barrier with an SEI-free surface, permeable to "A"-ions, coating the anode plating surface.

11. The battery of claim 10 wherein the ion-permeable barrier is selected from the group consisting of beta-alumina, phosphate, thiophosphate, and combinations thereof.

12. The battery of claim 1 further comprising:
an "A"-ion permeable membrane in the electrolyte separating the anode from the cathode; and,
wherein the electrolyte is a liquid electrolyte.

13. The method for cycling power in a transition metal cyanometallate (TMCM) cathode battery, the method comprising:
providing a battery with a TMCM cathode, an anode, and a non-aqueous electrolyte, where TMCM corresponds to the chemical formula of $A_X M1_N M2_M (CN)_Y \cdot d(H_2 O)$:
where "A" is selected from a group of alkali or alkaline earth metals;
where M1 and M2 are transition metals;
where X is in a range of 0 to 4;

where N is in a range of 0 to 2;
where M is in a range of 0 to 2;
where Y is in a range of 1 to 6;
where d is in a range of 0 to 14;
charging the battery using a charging current;
in response to the charging current, forming a plating of "A" metal overlying a plating surface of the anode;
discharging the battery; and,
in response to discharging the battery, removing the "A" metal plating from the anode plating surface.

14. The method of claim 13 wherein charging the battery includes charging the battery with a charging current greater than a first current level.

15. The method of claim 14 further comprising:
subsequent to discharging the battery, charging the battery with a charging current less than the first current level; and,
"A"-ions intercalating into the anode plating surface.

16. The method of claim 13 further comprising:
in an initial charging of the battery, forming a permanent solid electrolyte interphase (SEI) layer overlying the anode plating surface; and,
in subsequent charging and discharging cycles, maintaining the permanent SEI layer overlying the anode plating surface.

17. The method of claim 16 wherein charging the battery includes the permanent SEI layer passing "A"-ions to the anode plating surface.

18. The method of claim 13 wherein providing the anode includes the anode plating surface being a material selected from the group consisting of metals, carbonaceous materials, semiconductors, and conductive polymers.

19. The method of claim 13 wherein providing the anode includes providing an anode with an ion-permeable barrier, permeable to "A"-ions, coating the anode plating surface; and,
wherein charging the battery includes failing to form an SEI layer overlying the anode plating surface when the battery is being charged.

20. The method of claim 19 wherein the ion-permeable barrier is selected from the group consisting of beta-alumina, phosphate, thiophosphate, and combinations thereof.

21. A transition metal cyanometallate (TMCM) cathode battery with a metal plating anode, the battery comprising:
a TMACM cathode comprising $A_X M1_N M2_M (CN)_Y \cdot d (H_2O)$,
where "A" is selected from a group of alkali or alkaline earth metals;
where M1 and M2 are transition metals;
where X is in a range of 0 to 4;
where N is in a range of 0 to 2;
where M is in a range of 0 to 2;
where Y is in a range of 1 to 6;
where d is in a range of 0 to 14;
a non-aqueous electrolyte; and,
an anode comprising a plating surface, configured such that no "A" metal overlying the plating surface when the battery is in the discharged state, and with an overlaying layer of "A" metal plating when the battery is in the charged state, and wherein the "A" ions fail to intercalate into the plating surface of the anode when the battery is in the charged state.

* * * * *